US008175783B2

(12) United States Patent
Park

(10) Patent No.: US 8,175,783 B2
(45) Date of Patent: May 8, 2012

(54) ORGAN TYPE ACCELERATOR PEDAL ASSEMBLY

(75) Inventor: Hangil Park, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 783 days.

(21) Appl. No.: 12/323,933

(22) Filed: Nov. 26, 2008

(65) Prior Publication Data

US 2009/0157274 A1 Jun. 18, 2009

(30) Foreign Application Priority Data

Dec. 15, 2007 (KR) ........................ 10-2007-0131790

(51) Int. Cl.
*G06F 7/70* (2006.01)
*G06G 7/00* (2006.01)

(52) U.S. Cl. ......... 701/70; 123/399; 701/85; 74/473.16; 303/155

(58) Field of Classification Search .................... 701/70, 701/85; 123/370, 399; 84/453–454, 721; 267/182; 188/171, 166; 192/41 S, 48.3; 482/4–5, 7; 74/512–513, 473.16; 303/155
See application file for complete search history.

(56) References Cited

U.S. PATENT DOCUMENTS

| | | | | |
|---|---|---|---|---|
| 4,351,405 | A * | 9/1982 | Fields et al. | 180/65.225 |
| 4,519,369 | A * | 5/1985 | Kitamura | 123/337 |
| 6,295,891 | B1 * | 10/2001 | Velte et al. | 74/513 |
| 7,603,228 | B2 * | 10/2009 | Coughlin | 701/123 |
| 7,717,012 | B2 * | 5/2010 | Kim et al. | 74/512 |
| 7,798,578 | B2 * | 9/2010 | Lewis et al. | 303/151 |
| 7,946,192 | B2 * | 5/2011 | Kim et al. | 74/513 |
| 2001/0039230 | A1 * | 11/2001 | Severinsky et al. | 477/3 |
| 2008/0042489 | A1 * | 2/2008 | Lewis et al. | 303/152 |
| 2008/0100129 | A1 * | 5/2008 | Lubbers | 303/113.1 |
| 2009/0157274 | A1 * | 6/2009 | Park | 701/70 |
| 2010/0030458 | A1 * | 2/2010 | Coughlin | 701/123 |
| 2010/0234179 | A1 * | 9/2010 | Cronje | 482/4 |
| 2011/0132134 | A1 * | 6/2011 | Kim et al. | 74/514 |
| 2011/0187521 | A1 * | 8/2011 | Beruscha et al. | 340/441 |

FOREIGN PATENT DOCUMENTS

| | | |
|---|---|---|
| JP | 1-92537 A | 4/1989 |
| JP | 5-231194 A | 9/1993 |
| JP | 6 249956 | 9/1994 |

(Continued)

OTHER PUBLICATIONS

Development of Plastic Organ-type Accelerator Pedal Assembly; Sakuraba Tomohiro (Honda R & D. Co., Ltd., Tochigi Labs.) Nebuya Hideto (Honda R & D. Co., Ltd., Tochigi Labs.) Kato Teruo (Ftech Inc., JPN) Abe Tomoaki (Ftech Inc., JPN) ; vol. 15;No. 2;p. 189-194(2003).*

(Continued)

*Primary Examiner* — Cuong H Nguyen
(74) *Attorney, Agent, or Firm* — Morgan, Lewis & Bockius LLP

(57) ABSTRACT

An organ type accelerator pedal assembly may include a vibration generating module coupled to a carrier connected with a foot plate, and engaged with a first actuator through a power transfer member to bring a vibration to the carrier, a pushing-force generating module actuated by a second actuator and movably disposed under the vibration generating module to provide a pushing-force to the foot plate when contacting with the vibration generating module, and/or a control unit controlling the first actuator and/or the second actuator.

19 Claims, 5 Drawing Sheets

FOREIGN PATENT DOCUMENTS

| | | | | |
|---|---|---|---|---|
| JP | 10 264676 | | | 10/1998 |
| JP | 10 264678 | | | 10/1998 |
| KR | 2001-0093486 | A | | 10/2001 |
| KR | 2004110389 | A | * | 12/2004 |
| KR | 501387 | B | * | 7/2005 |
| KR | 10 2006 0012550 | A | | 2/2006 |
| KR | 10-0666865 | B1 | | 1/2007 |
| KR | 10-2009-0119574 | | * | 12/2009 |
| WO | PCT/DE98/02659 | | * | 6/1999 |
| WO | PCT/EP2009/055268 | | * | 4/2011 |

OTHER PUBLICATIONS

A method of road condition estimation and feedback utilizing haptic pedal;Aoki, J.; Murakami, T.; Advanced Motion Control, 2008. AMC '08. 10th IEEE International Workshop on; Digital Object Identifier: 10.1109/AMC.2008.4516165; Publication Year: 2008 , pp. 777-782.*

Sensorial system minimization to estimate the driver activity on the vehicle's pedals; Prieto, A.; Espinosa, F.; Lázaro, J.L.; Wefky, A.; Emerging Technologies and Factory Automation (ETFA), 2010 IEEE Conference on; Digital Object Identifier: 10.1109/ETFA.2010.5641172; Publication Year: 2010 , pp. 1-8.*

Pedal error prediction by driver foot gesture analysis: A vision-based inquiry; Tran, C.; Doshi, A.; Trivedi, M.M.; Intelligent Vehicles Symposium (IV), 2011 IEEE; Digital Object Identifier: 10.1109/IVS.2011.5940548; Publication Year: 2011 , pp. 577-582.*

A comparative analysis of electronic pedal algorithms using a driver-in-the-loop simulator and system identification of driver behavior;Boris, R.; Vermillion, C.; Butts, K.; American Control Conference (ACC), 2010; Publication Year: 2010 , pp. 682-687.*

* cited by examiner

ORGAN TYPE ACCELERATOR PEDAL ASSEMBLY

CROSS-REFERENCE TO RELATED APPLICATION

The present application claims priority to Korean Application Number 10-2007-0131790 filed Dec. 15, 2007, the entire contents of which application is incorporated herein for all purposes by this reference.

BACKGROUND OF THE INVENTION

1. Field of the Invention

The present invention relates to an organ type accelerator pedal assembly, particularly a technology about an organ type accelerator pedal assembly that calls a driver's attention by forcibly vibrating the foot plate and pushing the foot plate at the same time in an emergency, such as when a vehicle drives over the speed limit of a road or shorter than a predetermined distance from the vehicle next ahead.

2. Description of Related Art

In general, the accelerator pedal assembly of a vehicle, a device that controls the amount of intake of a mixture for a gasoline engine and controls the rpm of a diesel engine by the amount of fuel injection, is divided into a pendent type in which the accelerator pedal is hung by the dash panel and an organ type in which the accelerator pedal is mounted on the floor panel.

Recently, the pendent type of accelerator pedal assembly is widely used, but it cannot provide good operational sensitivity to the driver because the operation is not smooth, thereby increasing fatigue.

On the contrary, according to the organ type of accelerator pedal assembly that can remove the drawbacks of the pendent type, fatigue is reduced by improving the operational sensitivity for the driver and the throttle valve can be accurately controlled, such that it can satisfy both the economical efficiency and safety. Further, using the organ type of accelerator pedal is helpful for the vehicle's deluxe impression by improving the interior beauty, such that application of the organ type of accelerator is significantly increasing from deluxe vehicles in recent years.

FIG. 1 a view showing the conceptual configuration of a common organ type accelerator pedal assembly, which includes a housing 1, a foot plate 2, a pivot arm 3, a carrier 4, and a spring 5. Housing 1 is fixed to the floor panel below the driver's seat. Foot plate 2 has one end hinged to housing 1 and the other end pivoting up/down with respect to housing 1 as being pushed/released by the driver. Pivot arm 3 makes see-saw motion in housing 1 as foot plate 2 is operated, with respect to a central shaft 3*a* at the middle portion. Carrier 4 passes through housing 1 and of which both ends are connected with foot plate 2 and one end of pivot arm 3. Spring 5 has both ends connected to pivot arm 3 and the inner side of housing 1 and adds an elastic returning force to the see-saw motion of pivot arm 3.

When the above organ type accelerator pedal assembly electronically operates, a sensor mounted to housing 1 detects changes in output by the see-saw motion of pivot arm 3 and sends an electrical signal to a throttle control unit (TCU), and then the throttle control unit sends a control unit to start an actuator, such that a throttle valve adjusts the amount of fuel by opening/closing.

On the other hand, the above organ type accelerator pedal assembly mechanically operates, as pivot arm 3 makes the see-saw motion, a connecting cable connected to pivot arm 3 is pulled and an accelerator cable is correspondingly pulled, such that the throttle valve adjusts the amount of fuel by opening/closing.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an organ type accelerator pedal assembly that calls the driver's attention to help safe driving by adding a function that forcibly vibrates the foot plate and pushes the foot plate at the same time in an emergency, such as when a vehicle drives over the speed limit or under a predetermined distance from the vehicle next ahead.

In an aspect of the present invention, an organ type accelerator pedal assembly may include a motor that is fixed to a side of a housing, a vibration generating module that is coupled to a carrier connected to a foot plate, adjacent to the motor on the side of the housing, and engaged with the motor through a belt to move up/down the carrier in a short cycle while rotating by power of the motor, a solenoid that is fixed to the housing around the motor, a pushing-force generating module that is connected with the solenoid through a solenoid rod and makes elastic linear reciprocation by motion of the solenoid to provide a pushing-force to the foot plate when contacting with the vibration generating module, and/or a controller that compares speed limit of a road transmitted from a GPS with driving speed transmitted from a vehicle speed sensor and then generates a control signal to actuate the motor when the driving speed exceeds the speed limit of the road, and receives a signal from an inter-vehicle distance sensor and then generates a control signal to actuate the solenoid when distance from a vehicle next ahead is under a predetermined value.

The organ type accelerator pedal assembly may further include a case that is fixed to the housing and equipped with the solenoid and the pushing-force generating module, covering and protecting the motor and the vibration generating module.

The vibration generating module may include a cam shaft that has an end rotatably connected to the housing through a slot thereof and the other end engaged with the belt to be rotated by the power of the motor transmitted through the belt, a cam that is integrally connected to the cam shaft and rotates with the cam shaft, a carrier rod that has an end coupled to the carrier and that has the other end integrally connected with a vibration transmission plate which is in slidable contact with the cam, the other end passing through a guide slot of the housing, and/or first and second support plates that are fixed to the case at both sides of the cam and the first support plate has a first guide hole that guides up-down motion of the cam shaft and the second support plate has a second guide hole that guides motion of the carrier rod.

The first and second guide holes may be curved along substantially the same trajectory as motion of the carrier.

The pushing-force generating module may include a spring box that is disposed in the case and connected with the solenoid rod such that the spring box moves under the cam shaft in a horizontal direction by operation of the solenoid, a return spring that has an end connected to the spring box and the other end connected to the case to add an elastic return force to movement of the spring box, a pushing-force generating block that is slidably inserted into the spring box, supported by a pushing-force generating spring disposed in the spring box, and elastically moves up/down with the cam shaft by contact with the cam shaft.

In another aspect of the present invention, an organ type accelerator pedal assembly may include a vibration generating module coupled to a carrier connected with a foot plate, and engaged with a first actuator through a power transfer member to bring a vibration to the carrier, a pushing-force generating module actuated by a second actuator and movably disposed under the vibration generating module to provide a pushing-force to the foot plate when contacting with the vibration generating module, and/or a control unit controlling the first actuator and/or the second actuator.

The control unit may compare speed limit of a road transmitted from a GPS with driving speed transmitted from a vehicle speed sensor and then generates a control signal to actuate the first actuator when the driving speed exceeds the speed limit of the road.

The control unit may receive a signal from an inter-vehicle distance sensor and then generates a control signal to actuate the second actuator when distance from a vehicle next ahead is under a predetermined value.

The power transfer member may be a belt.

The first actuator may be a motor.

The second actuator may be a solenoid having a solenoid rod coupling the solenoid and the pushing-force generating module.

The vibration generating module may include a cam shaft, one end of which is rotatably connected to a housing through a slot formed at the housing and the other end of which is engaged with the power transfer member to be rotated by the first actuator, a cam integrally connected to the cam shaft to rotate with the cam shaft, a carrier rod, an end portion of which is connected with the carrier and the other end portion of which is integrally connected with a vibration transmission plate which is in slidable contact with the cam, wherein the other end portion of carrier rod is configured to pass through a guide slot formed at the housing, and/or first and second support plates that are fixed to a stationary member, wherein the cam is disposed therebetween, the first support plate having a first guide hole that guides motion of the cam shaft therein and the second support plate having a second guide hole that guides motion of the carrier rod therein.

The stationary member may be a case

The first and second guide holes may be curved along substantially the same trajectory as motion of the carrier.

The pushing-force generating module may include a containing member connected with the second actuator to move under the cam shaft in forward and rearward directions by the second actuator, a first elastic member that has an end connected to the containing member to add a return force to movement of the containing member, a pushing-force generating block slidably inserted into the containing member, supported by a second elastic member disposed in the containing member, and elastically moving up/down with the cam shaft by contact with the cam shaft.

The first elastic member may be a return spring connected to a stationary member.

The second elastic member may be a return spring.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

An organ type accelerator pedal assembly according to various embodiments of the present invention, as shown in FIGS. 2 to 5, includes a housing 1 that is fixed to the floor panel below the driver's seat, a foot plate 2 that has an end hinged to housing 1 and the other end pivoting up/down with respect to housing 1 as being pushed/released by the driver, and a carrier 4 that has an end connected to foot plate 2, passing through housing 1.

Figure 1:
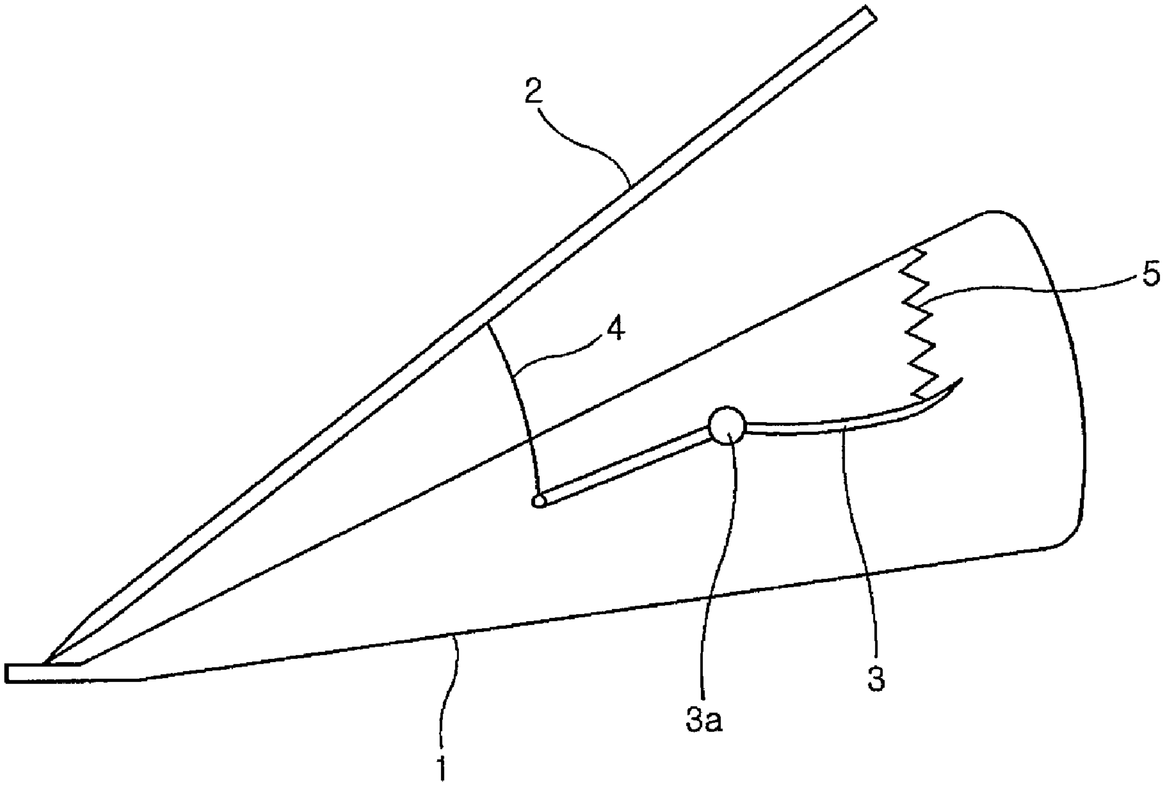
FIG. 1 is a conceptual view showing the configuration of a common organ type accelerator pedal assembly.
Figure 2:
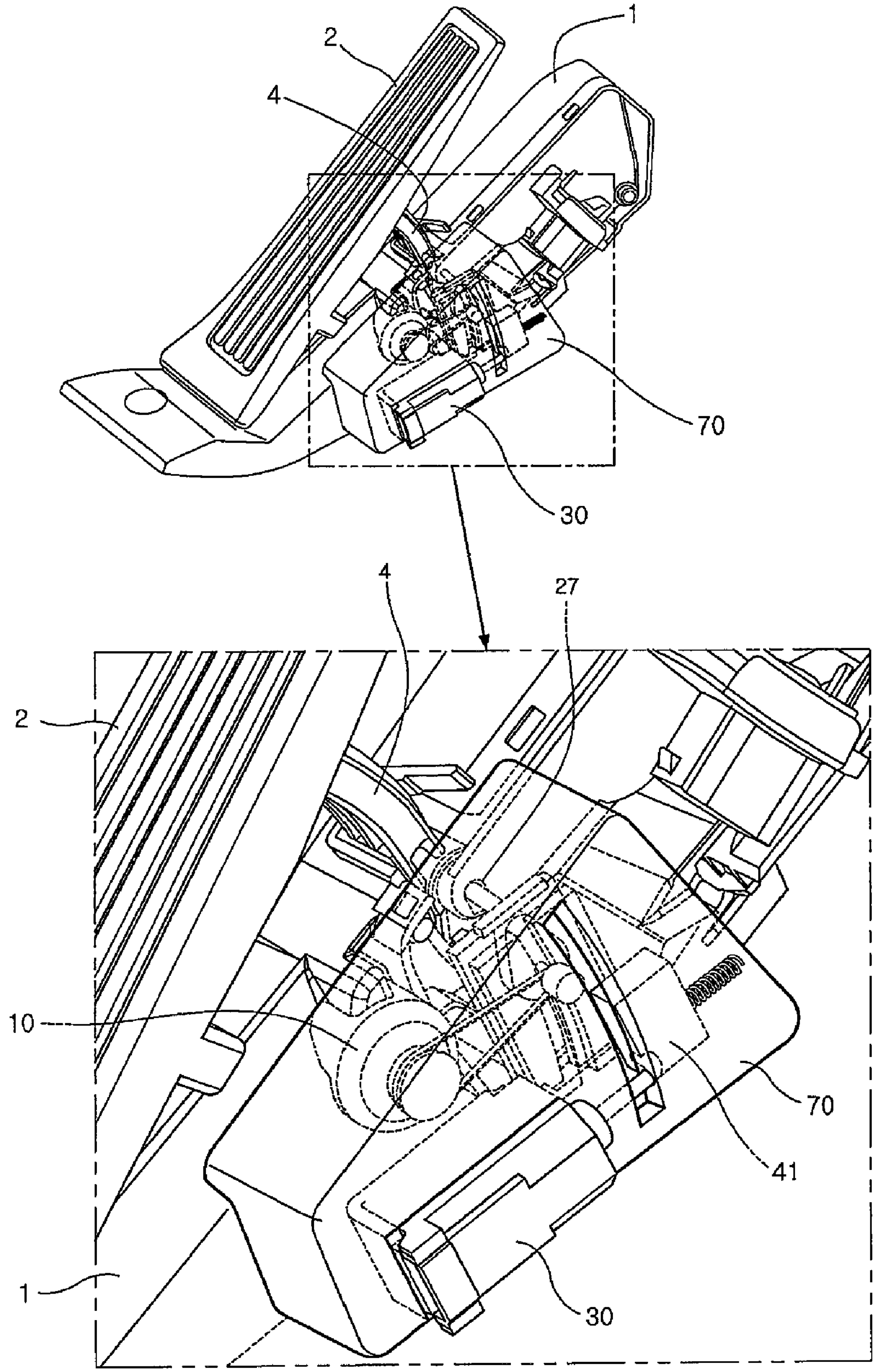
FIGS. 2 to 5 are views illustrating the configuration of an organ type accelerator pedal assembly equipped with a vibration generating module and a pushing-force generating module according to an exemplary embodiment of the invention.
Figure 3:
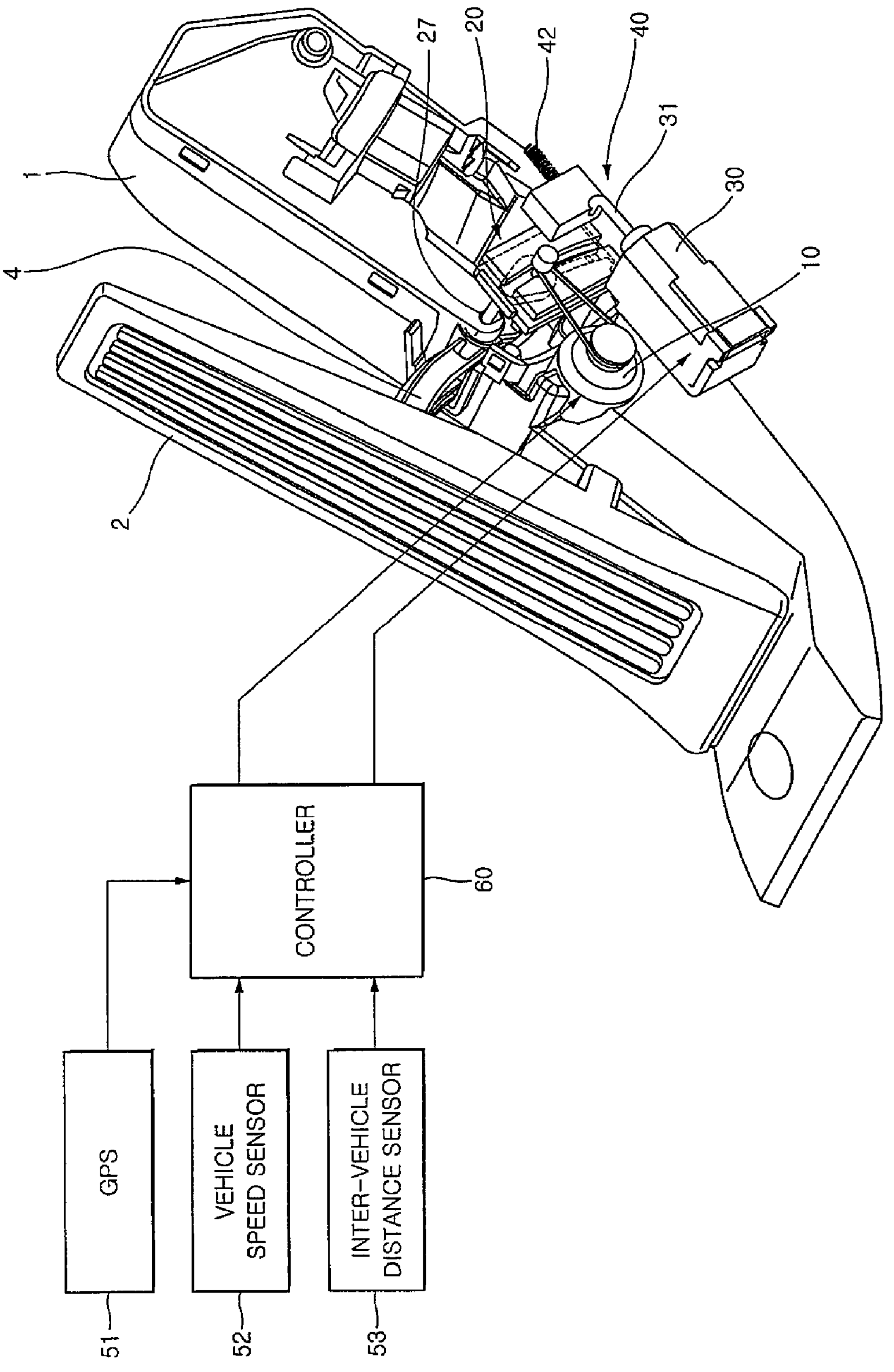

As shown in FIG. 1, the organ type accelerator pedal assembly of the present invention may further include a pivot arm 3 that makes see-saw motion in housing 1 as foot plate 2 is operated, by a central shaft 3*a* at the middle portion and a spring 5 that has both ends connected to pivot arm 3 and the inner side of housing 1 and adds an elastic returning force to the see-saw motion of pivot arm 3.

Further, the organ type accelerator pedal assembly according to various embodiments of the present invention may further include a motor 10, a vibration generating module 20, a solenoid 30, a pushing-force generating module 40, a controller 60, and a case. Motor 10 is fixed to a side of housing 1.

Vibration generating module 20 is connected with carrier 4 connected with foot plate 2, adjacent to motor 10 on the side of housing 1, and connected with motor 10 through a belt 11 to move up/down carrier 4 in a short cycle while rotating by power of motor 10. Solenoid 30 is fixed around motor 10.

Pushing-force generating module 40 is connected with solenoid 30 through a solenoid rod 31 and can make elastic linear reciprocation by motion of solenoid 30 to provide a pushing-force to foot plate 2 when contacting with vibration generating module 20.

Controller 60 compares the speed limit of the road transmitted from a GPS 51 with the driving speed transmitted from a vehicle speed sensor 52 and then generates a control signal to actuate motor 10 when the driving speed exceeds the speed limit of a road, and also receives a signal from an inter-vehicle distance sensor 53 and then generates a control signal to actuate solenoid 30 when the distance from the vehicle next ahead is under a predetermined value. Case is fixed to housing 1 and equipped with solenoid 30 and pushing-force generating module 40, covering and protecting motor 10 and vibration generating module 20.

Vibration generating module 20 includes a cam shaft 21, a cam 22, a carrier rod 24, and first and second support plates 25, 26. Cam shaft 21 has an end rotatably connected to housing 1 having a slot wherein the cam shaft 21 can move along the slot. The other end of the cam shaft 21 is coupled with belt 11 to be rotated by the power of motor 10 transmitted through belt 11. Cam 22 is integrally connected to cam shaft 21 and rotates with cam shaft 21. Carrier rod 24 has an end coupled to carrier 4 and integrally connected with a vibration transmission plate 23, which is in contact with cam 22, at the other end passing through a guide slot 27 formed at one side of housing 1. Through the guide slot 27 the carrier rod 24 may moves up and down.

First and second support plates 25, 26 are fixed to case at both sides of cam 22 and each have a first guide hole **25*a* that guides up-down motion of cam shaft 21 by movement of carrier 4 and a second guide hole 26*a* that guides up-down motion of carrier rod 24** as explained later.

First and second guide holes **25*a*, 26*a* are curved along the same trajectory as the up-down motion of carrier 4**.

Further, pushing-force generating module 40 includes a spring box 41, a return spring 42, and a pushing-force generating block 44. Spring box 41 is disposed in case and connected with solenoid rod 31 such that it can move in forward and rearward directions under the cam shaft 21 by operation of solenoid 30. Return spring 42 has an end connected to spring box 41 and the other end connected to a stationary member such as case to add an elastic return force to movement of spring box 41.

Pushing-force generating block 44 slidably inserted into the spring box 41 is supported by a pushing-force generating spring 43 disposed in spring box 41 and can elastically move up/down by contact with cam shaft 21.

The operation of various embodiments of the present invention is described hereafter.

When a vehicle starts to drive, controller 60 receives the speed limit of a road from GPS 51 and the driving speed from vehicle speed sensor 52 at the same time, and then checks whether the driving speed of the vehicle exceeds the speed limit of the road.

In determining that the driving speed of the vehicle exceeds the speed limit of the road, controller 60 sends a control signal to actuate motor 10.

As motor 10 starts to be operated, the power of motor 10 is transmitted to cam shaft 21 through belt 11 and cam shaft 21 makes an axial rotation with cam 22.

In various embodiments of the present invention, the motor 10 may rotate the belt 11 in the counterclockwise direction so that the cam shaft 21 is biased upwards to make a space for the pushing force generation module 40 to move in a horizontal direction under the cam shaft 21.

As cam 22 rotates, vibration transmission plate 23 connected to the carrier rod 24 repeats up-down motion along the guide slot 27 in a short cycle and the motion of vibration transmission plate 23 is transmitted to foot plate 2 through carrier rod 24.

As a result, the driver with his/her foot on foot plate 2 feels strong vibration (oscillation) of foot plate 2 and easily recognizes that the driving speed of the vehicle that is in travel is over the speed limit of the road.

Therefore, the driver slowly decreases the pushing force applied on foot plate to slow down the vehicle such that the driving speed of the vehicle becomes under the speed limit of the road.

Further, when the vehicle starts to drive, controller 60 receives a signal from inter-vehicle distance sensor 53 and checks whether the inter-vehicle distance from the vehicle next ahead is under a predetermined value.

When determining that the inter-vehicle distance from the vehicle next ahead is under the predetermined value, controller 60 sends a control signal to actuate solenoid 30.

Figure 4:
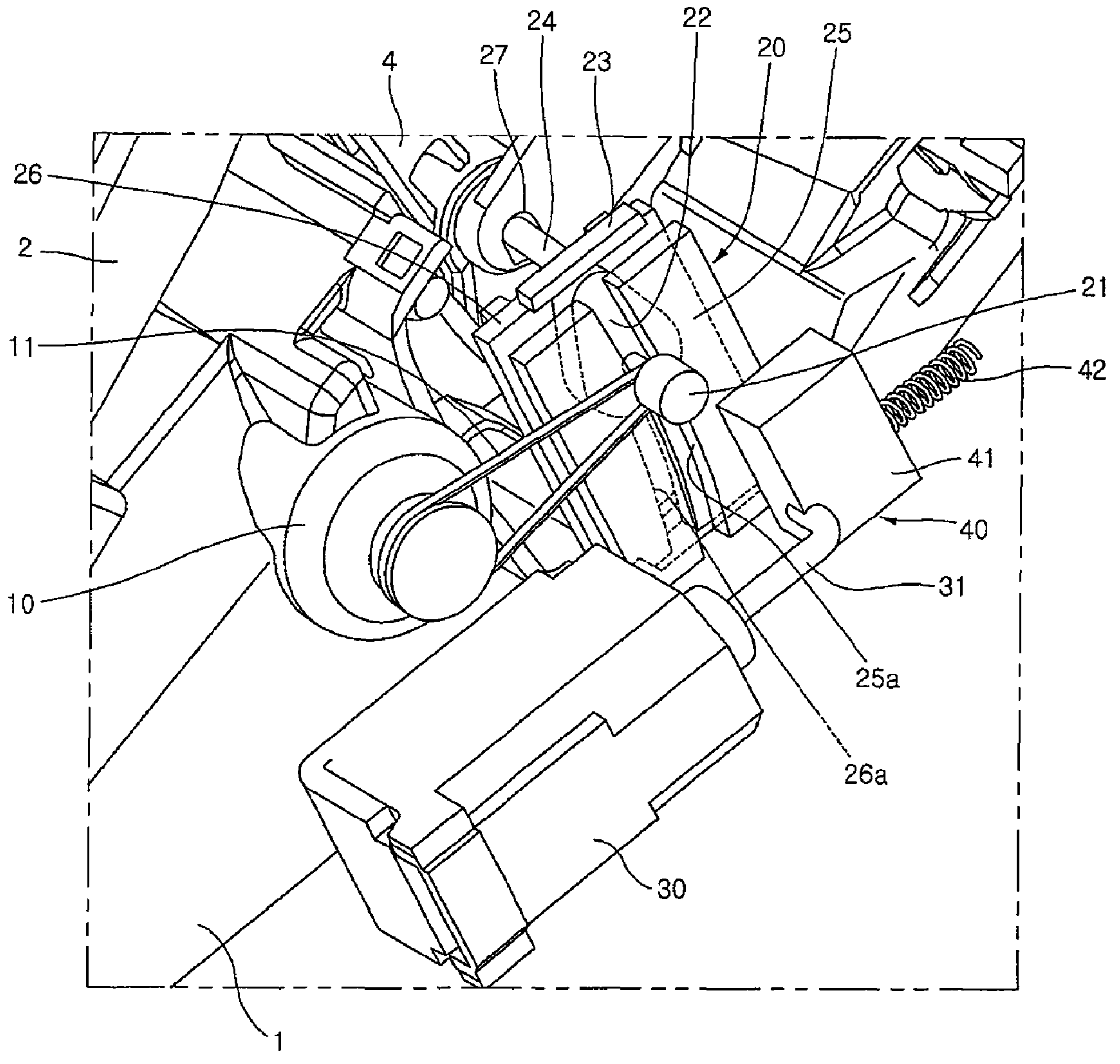
Figure 5:
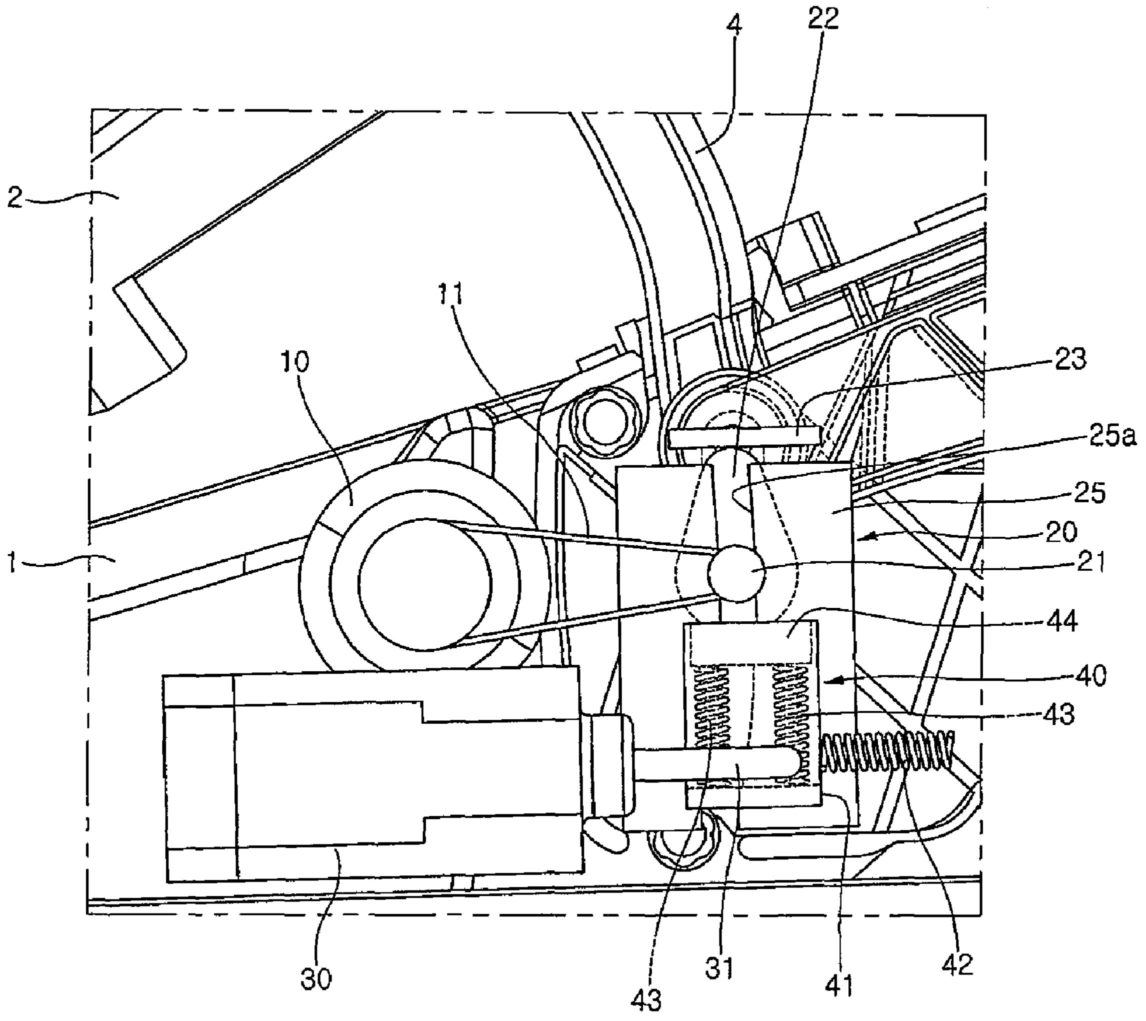

As solenoid 30 is actuated, solenoid rod 31 moves to pull the spring box 44 from the position shown in FIG. 4 to the left toward solenoid 30. Accordingly, spring box 41 moves to the left and pushing-force generating block 44 correspondingly moves under cam shaft 21 as shown in FIG. 5.

When spring box 41 reaches under cam shaft 21, return spring 42 is tensioned with the entire length increased.

With spring box 41 under cam shaft 21, when the driver does not recognize that the inter-vehicle distance from the vehicle next ahead is decreased under a critical value and adds a force to foot plate 2, carrier 4 connected with foot plate 2 moves down.

The down motion of carrier 4 is sequentially transmitted to cam shaft 21 through carrier rod 24 and vibration transmission plate 23, and cam 22 and cam shaft 21 move down along first guide hole **25*a***.

When cam shaft 21 moving down along first guide hole **25*a* contacts with pushing-force generating block 44, a reacting force by the elastic force of pushing-force generating spring 43 starts to be sequentially transmitted to foot plate 2 through cam shaft 21, cam 22, vibration transmission plate 23, carrier rod 24, and carrier 4** in sequence.

As a result, the driver with his/her foot on foot plate 2 feels the reacting force by the elastic force of pushing-force generating spring 43, such that he/her can easily recognizes that the inter-vehicle distance reaches the critical value.

Therefore, the driver slowly decreases the force applied to foot plate 2 to slow down the vehicle, such that it is possible to sufficiently secure a safe inter-vehicle distance from the vehicle next ahead sufficient.

According to an organ type accelerator pedal assembly of the present invention, it is possible to allow a driver to safely drives a vehicle by warning an emergency to the driver, such as when a vehicle drives over the speed limit or under a predetermined distance from the vehicle next ahead.

For convenience in explanation and accurate definition in the appended claims, the terms “up”, “down”, “forwards”, “rearwards” and “inner” are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An organ type accelerator pedal assembly comprising:

a motor that is fixed to a side of a housing;

a vibration generating module that is coupled to a carrier connected to a foot plate, adjacent to the motor on the side of the housing, and engaged with the motor through a belt to move up/down the carrier in a short cycle while rotating by power of the motor;

a solenoid that is fixed to the housing around the motor;

a pushing-force generating module that is connected with the solenoid through a solenoid rod and makes elastic linear reciprocation by motion of the solenoid to provide a pushing-force to the foot plate when contacting with the vibration generating module; and a controller that compares speed limit of a road transmitted from a GPS with driving speed transmitted from a vehicle speed sensor and then generates a control signal to actuate the motor when the driving speed exceeds the speed limit of the road, and receives a signal from an inter-vehicle distance sensor and then generates a control signal to actuate the solenoid when distance from a vehicle next ahead is under a predetermined value.

2. The organ type accelerator pedal assembly as defined in claim 1, further comprising:

a case that is fixed to the housing and equipped with the solenoid and the pushing-force generating module, covering and protecting the motor and the vibration generating module.

3. The organ type accelerator pedal assembly as defined in claim 2, wherein the vibration generating module includes:

a cam shaft that has an end rotatably connected to the housing through a slot thereof and the other end engaged with the belt to be rotated by the power of the motor transmitted through the belt;

a cam that is integrally connected to the cam shaft and rotates with the cam shaft;

a carrier rod that has an end coupled to the carrier and that has the other end integrally connected with a vibration transmission plate which is in slidable contact with the cam, the other end passing through a guide slot of the housing; and first and second support plates that are fixed to the case at both sides of the cam and the first support plate has a first guide hole that guides up-down motion of the cam shaft and the second support plate has a second guide hole that guides motion of the carrier rod.

4. The organ type accelerator pedal assembly as defined in claim 3, wherein the first and second guide holes are curved along substantially the same trajectory as motion of the carrier.

5. The organ type accelerator pedal assembly as defined in claim 2, wherein the pushing-force generating module includes:

a spring box that is disposed in the case and connected with the solenoid rod such that the spring box moves under the cam shaft in a horizontal direction by operation of the solenoid;

a return spring that has an end connected to the spring box and the other end connected to the case to add an elastic return force to movement of the spring box;

a pushing-force generating block that is slidably inserted into the spring box, supported by a pushing-force generating spring disposed in the spring box, and elastically moves up/down with the cam shaft by contact with the cam shaft.

6. An organ type accelerator pedal assembly comprising:

a vibration generating module coupled to a carrier connected with a foot plate, and engaged with a first actuator through a power transfer member to bring a vibration to the carrier;

a pushing-force generating module actuated by a second actuator and movably disposed under the vibration generating module to provide a pushing-force to the foot plate when contacting with the vibration generating module; and a control unit controlling the first actuator and/or the second actuator.

7. The organ type accelerator pedal assembly as defined in claim 6, wherein the control unit compares speed limit of a road transmitted from a GPS with driving speed transmitted from a vehicle speed sensor and then generates a control signal to actuate the first actuator when the driving speed exceeds the speed limit of the road.

8. The organ type accelerator pedal assembly as defined in claim 6, wherein the control unit receives a signal from an inter-vehicle distance sensor and then generates a control signal to actuate the second actuator when distance from a vehicle next ahead is under a predetermined value.

9. The organ type accelerator pedal assembly as defined in claim 6, wherein the power transfer member is a belt.

10. The organ type accelerator pedal assembly as defined in claim 6, wherein the first actuator is a motor.

11. The organ type accelerator pedal assembly as defined in claim 6, wherein the second actuator is a solenoid having a solenoid rod coupling the solenoid and the pushing-force generating module.

12. The organ type accelerator pedal assembly as defined in claim 6, wherein the vibration generating module includes:

a cam shaft, one end of which is rotatably connected to a housing through a slot formed at the housing and the other end of which is engaged with the power transfer member to be rotated by the first actuator;

a cam integrally connected to the cam shaft to rotate with the cam shaft;

a carrier rod, an end portion of which is connected with the carrier and the other end portion of which is integrally connected with a vibration transmission plate which is in slidable contact with the cam, wherein the other end portion of carrier rod is configured to pass through a guide slot formed at the housing; and first and second support plates that are fixed to a stationary member, wherein the cam is disposed therebetween, the first support plate having a first guide hole that guides motion of the cam shaft therein and the second support plate having a second guide hole that guides motion of the carrier rod therein.

13. The organ type accelerator pedal assembly as defined in claim 12, wherein the stationary member is a case.

14. The organ type accelerator pedal assembly as defined in claim 12, wherein the first and second guide holes are curved along substantially the same trajectory as motion of the carrier.

15. The organ type accelerator pedal assembly as defined in claim 6, wherein the pushing-force generating module includes:

a containing member connected with the second actuator to move under the cam shaft in forward and rearward directions by the second actuator;

a first elastic member that has an end connected to the containing member to add a return force to movement of the containing member;

a pushing-force generating block slidably inserted into the containing member, supported by a second elastic member disposed in the containing member, and elastically moving up/down with the cam shaft by contact with the cam shaft.

16. The organ type accelerator pedal assembly as defined in claim 15, wherein the first elastic member is a return spring connected to a stationary member.

17. The organ type accelerator pedal assembly as defined in claim 15, wherein the second elastic member is a return spring.

18. A passenger vehicle compressing the organ type accelerator pedal assembly as defined in claim 1.

19. A passenger vehicle compressing the organ type accelerator pedal assembly as defined in claim 6.

* * * * *